Figure 1:
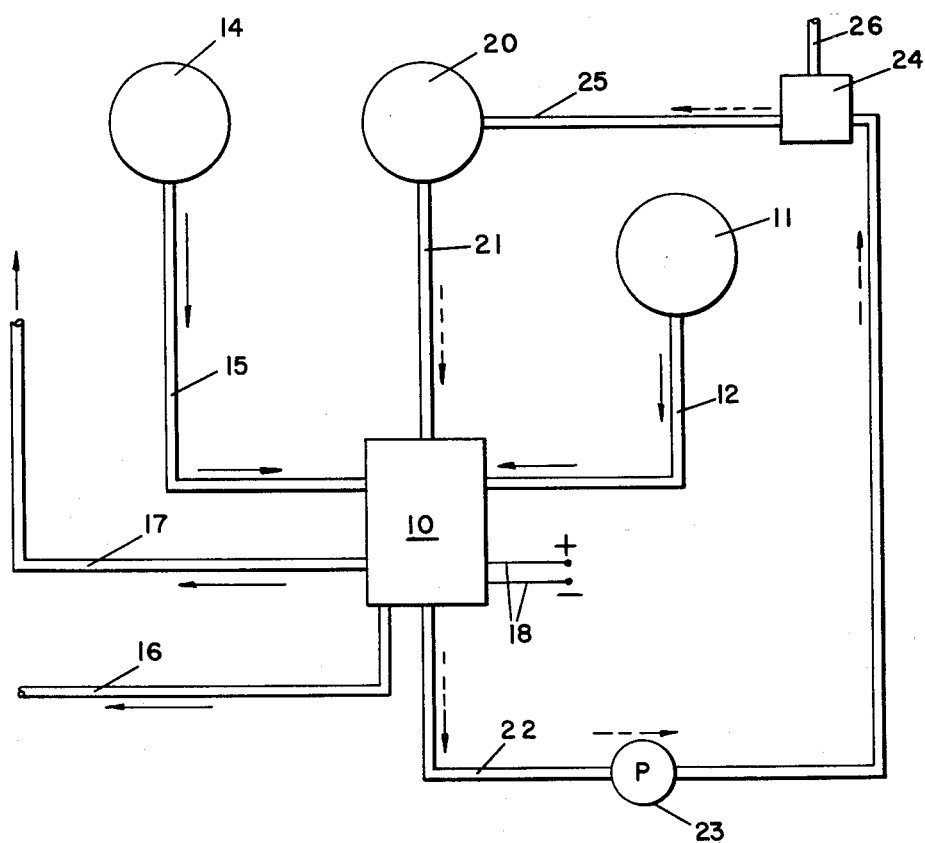

May 4, 1965 K. D. MILLER, JR 3,181,848
AMALGAM REGENERATOR FOR PRIMARY BATTERY SYSTEM
Filed April 23, 1962 2 Sheets-Sheet 2

INVENTOR.
KENNETH D. MILLER, JR.
BY
ATTORNEY

United States Patent Office 3,181,848
Patented May 4, 1965

3,181,848
AMALGAM REGENERATOR FOR PRIMARY
BATTERY SYSTEM
Kenneth D. Miller, Jr., Princeton, N.J., assignor, by mesne assignments, to the United States of America as represented by the Secretary of the Navy
Filed Apr. 23, 1962, Ser. No. 190,205
1 Claim. (Cl. 266—34)

This invention relates to a primary battery system and is particularly concerned with such a system which is capable of delivering electrical energy continuously and at high rates by the efficient transformation of chemical energy into electrical energy.

It is known that electrical energy may provided by the use of dry cells or storage batteries and while these elements have marked utility for certain purposes, they are deficient as sources of large reserve power without replacement or recharging. Primary battery cells are also known which employ, for example, zinc or similar metals as electrodes and a stationary body of fluid electrolyte but these have been found to provide inefficient operation because of low current production. In battery systems which use a stationary electrolyte, the by-products of the chemical reactions by which the electrical energy is obtained accumulate in the cell or system and result in the delivery of progressively decreasing amounts of electrical energy. Fuel cells have been proposed to supplant the conventional primary battery cells but these have generally been found to have practical defects and have gone into only limited experimental use or use in limited environments.

The primary battery system with which the present invention is concerned is described in Chemical Engineering Progress, vol. 57, February 1961, at pages 140 and 141. The system disclosed therein is particularly adapted for submarine use and is designed primarily to supplement the main power system and supply the power required for the auxiliary equipment and it may be used to supply power for propulsion of the vessel. The various reactants used in the instant battery system are supplied in a generally continuous manner and replenished as necessary in order that the output of electrical energy will be maintained substantially constant and the system operated at or near maximum efficiency. The battery system for which the present invention is especially adapted involves the use of a group of a selected number of fuel cells, depending on the electrical output required, which are connected as desired in series or in series parallel and to which are supplied the reactants comprising an alkali metal such as sodium and an oxidant such as oxygen or air and sea water which provides the electrolyte for the system.

Since certain alkali metals, such as sodium, will form an explosive mixture with the sea water electrolyte, the system contemplates admitting the selected metal in the state or form of an amalgam to the cells. Preparation of the amalgam of the desired or necessary concentration for use in a continuous system presents a problem in that it has been found difficult to intimately mix the metal with the mercury and therefore particularly difficult to provide an amalgam of the desired concentration. A substantially complete and intimate mixture of the metal and mercury is necessary since the mercury, in effect, functions primarily as a carrier for the metal and the metal content of the amalgam for the present primary battery system must be maintained at an extremely low value.

The problem of obtaining a sodium amalgam for use in the present battery system is more complex than simply adding sodium to mercury since the sodium concentration must be of a precise value and, additionally, the amalgam must be very pure and free of the formation of oxides. These oxides are insoluble in the amalgam and will form deposits on the cell plates and other cell surfaces which present operating difficulties. It has been determined that a sodium concentration above 0.55% in the amalgam results in the formation of a slurry consisting of a solid phase of approximately 0.7% sodium and a liquid phase of 0.55% sodium and that the solid amalgam phase will plug orifices in the cell equipment and filters and cause lowered operating efficiencies. A proper sodium concentration has been found to be of the order of 0.5%.

The broad object of the present invention is to provide an amalgam containing an alkali metal for use in a primary battery system.

Another object is to provide for the controlled supply of alkali metal to an amalgam to maintain the amalgam at desired metal concentration for use in a primary battery system.

Still another object is to regenerate amalgam of reduced alkali metal concentration by adding alkali metal thereto and effecting an intimate mixture by causing the materials to flow in a swirling and turbulent stream.

Another object is to provide for the intimate mixing of controlled amounts of sodium with sodium amalgam which is recirculated in a primary battery system in order to regenerate the amalgam to a desired sodium concentration.

Other objects will become apparent from a more detailed understanding of the invention.

Figure 2:
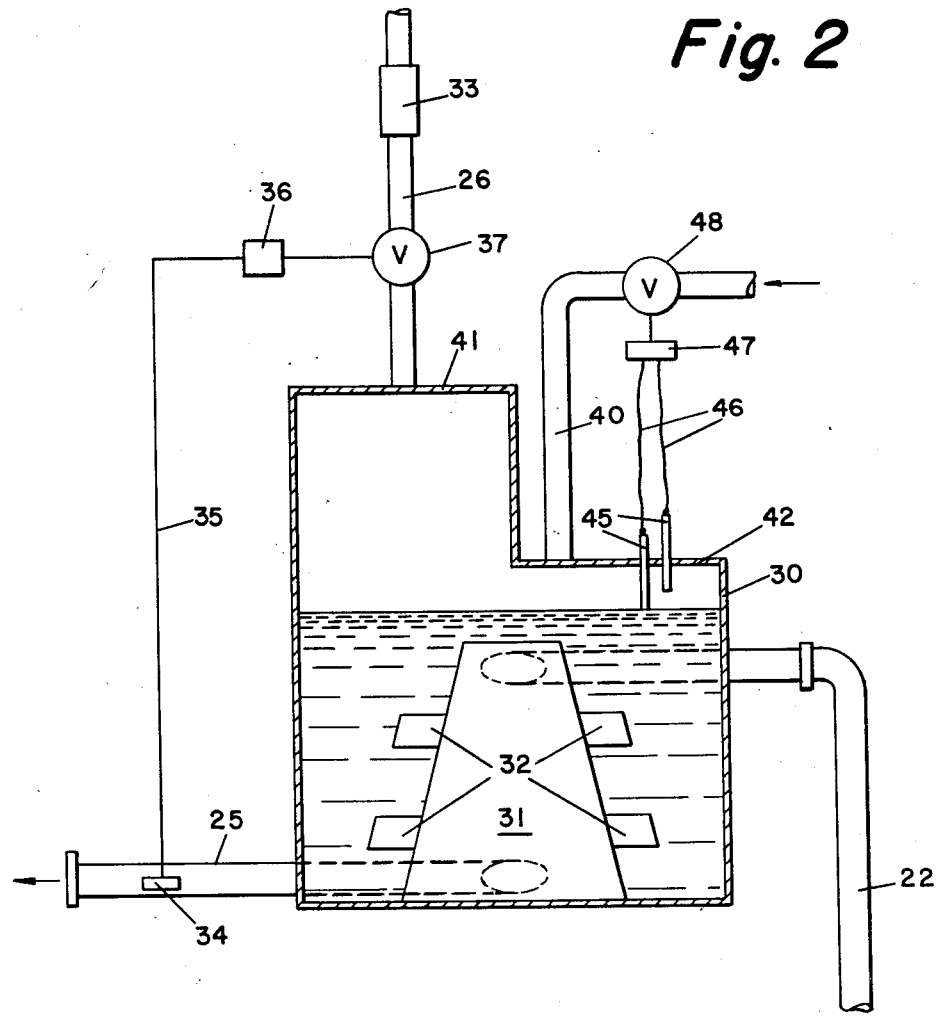

In the drawings:
FIG. 1 is a flow diagram of one arrangement of a primary battery system with which the present invention is used;
FIG. 2 is a view in sectional elevation of one type of mixing or regeneration vessel for the system of FIG. 1, showing structural details and controls.

Referring to FIG. 1, it will be understood that the elements of the primary battery system shown therein will be arranged within a submarine in a manner to occupy a minimum of space and this factor and such other factors as roll and pitch of the submarine must be considered in the structural design of certain of the elements in order to insure proper operation of the system.

The group of battery cells is indicated at 10, the source of electrolyte is indicated at 11 and in this battery system the electrolyte is sea water which is supplied to the cell group 10 by line 12 while an oxidant source is indicated at 14 and may be oxygen or air which is supplied to the cell group 10 by line 15. The amalgam circuit of the battery system is shown by the arrowed broken lines and will be described in detail later. As indicated by the arrowed broken line circuit, the amalgam is recirculated through the cell group 10 and as the reaction takes place therein used sea water and other waste will be removed by line 16, inert gases from the cell group will be removed by line 17 and the electrical energy will be taken off, for exampe, by leads 18.

Although the invention is applicable to other alkali metals, particularly those having a melting point of upwardly of 210° F., the following detailed description will be confined to the use of sodium.

Referring to the broken line amalgam circuit of FIG. 1, 20 indicates a source or vessel for the sodium amalgam which is supplied to the system at the desired sodium concentration, for example, 0.5% sodium. The amalgam is supplied by line 21 to the cell group 10 and removed at reduced sodium concentration by line 22 and fed by pump 23 to an amalgamator or regenerator zone 24 from which it is sent at the desired sodium concentration by line 25 to the source or vessel 20 for recirculation. Sodium is supplied to the amalgamator or regenerator 24 is controlled amounts by line 26 as will be explained in connection with the following description of FIG. 2.

The amalgam delivered by conduit 22 to the amalgamator or regenerator zone is at lowered sodium concentration than the amalgam supplied to the cells from the amalgam source. The sodium concentration of the amalgam entering the regenerator zone is in the neighborhool of 0.2% and must be regenerated by the addition of sodium before being sent back through the cell group at the desired sodium concentration of about 0.5%. In FIG. 2 the conduit 22 is placed in communication with a vessel 30 which is a regenerator wherein added sodium and the amalgam are mixed and for this purpose the conduit 22 is connected tangentially of the side wall of vessel 30 and in a plane a substantial distance above the bottom of the vessel while the conduit 25 which supplies the regenerated amalgam to the cell group 10 is preferably in communication with the vessel 30 tangentially thereof and adjacent the bottom, as shown. This structural arrangement provides a swirling action to the body of amalgam during its passage through the vessel between the inlet conduit 22 and outlet conduit 25 and in order to enhance the swirling action or to provide turbulence additional means is located in the vessel. This means is in the form of a frusto-conical vertical support member 31 which extends generally centrally of the vessel 30 from its bottom wall and is provided with a group of fins or baffles 32 which radiate outwardly therefrom. As the body of amalgam passes through the vessel 30 between the inlet conduit 22 and outlet conduit 25, additional sodium is supplied by the line 26 which is provided with a suitable heating means 33 in order to maintain the sodium in molten state for ready mixing with the body of amalgam as it moves in a swirling and turbulent state. The sodium supply line 26 communicates through the upper wall of the vessel in order that the sodium can be directed to the surface of the body of amalgam and picked up by the swirling and turbulent movement of the amalgam to provide an intimate mixture therewith. The sodium may fall by gravity into the body of amalgam or be supplied in spray form and by virtue of the swirling and turbulent action of the amalgam in the amalgamator 30, the sodium is prevented from forming a layer on the amalgam and is intimately mixed therewith to provide an amalgam of proper or desired concentration before it is recirculated by conduit 25 back into the system.

In order to provide an amalgram leaving the vessel 30 of the desired concentration, means in the form of a sensor 34 is located in the outlet conduit 25 in the path of the regenerated amalgam and is connected by conductor 35 to a controller 36 which operates a valve 37 located in the sodium line 26. The sensor and controller means 34 and 36 respectively are not shown in detail since such control equipment is known in the art and it will be understood that the valve 37 in line 26 will be operated by the voltage output from sensor 34 which is developed in accordance with the sodium content of the amalgam in line 25.

Since the equipment, as mentioned heretofore, is to be used in a submarine under conditions of extreme roll and pitch, regenerator vessel 30 is designed to maintain a gas space above a predetermined level of amalgam in the vessel. The level which is maintained will be sufficiently below the outlet of sodium line 26 to prevent the amalgam in the vessel 30 from interfering with the sodium supply. For the purpose of level control, gas, which may be argon, is supplied to vessel 30 by conduit 40 through its upper wall. The upper wall is formed in upper and lower sections as shown at 41 and 42 respectively to conveniently locate the control means which consists of a pair of elongate contactors 45—45. The contactors extend through the lower section 42, one having its lower end below the lower end of the other to form a circuit when the amalgam level covers the lower ends of both contactors. Conductors 46—46 extend upwardly from the contactors 45—45 a controller 47 which operates a valve 48 in conduit 40 and when circuit is made through the lower ends of the contactors 45—45 through the amalgam in the vessel 30, the gas supply will increase pressure in the gas space to lower the amalgam level.

The supply of amalgam to the vessel 30 and the amalgam removal therefrom will be regulated in order that a body of amalgam in vessel 30 will be maintained approximately at the level shown in FIG. 2 and this may be accomplished by providing suitable valves in conduits 22 and 25. Since the system is adapted particularly for submarine use, sea water is used as the electrolyte or to form the electrolyte but other electrolytic materials may be used when the battery system is used in other environments.

I claim:

In a primary battery system wherein amalgam of standard alkali metal concentration is admitted to a fuel cell for producing electrical energy and amalgam of reduced alkali metal concentration is removed from the cell and sent to regeneration apparatus for receiving additional alkali metal to bring the reduced amalgam up to standard concentration, the improvement in regeneration apparatus which comprises, (a) a close vessel having top and bottom walls interconnected by a cylindrical side wall, (b) an upright cone shaped device having its lower base end positioned on the bottom wall of the vessel and its upper end spaced from the top wall of the vessel, (c) upper baffle means and lower baffle means secured to the cone shaped device and extending laterally therefrom toward the side wall of the vessel, (d) a supply conduit for the amalgam of reduced concentration having a tangential connection with the side wall of the vessel in a plane above the upper baffle means and a removal conduit for amalgam of standard concentration having a tangential connection with the side wall of the vessel in a plane below the lower baffle means, (e) means for maintaining the amalgam in the vessel at a level above the tangential connection of the supply conduit and below the upper end of the vessel, (f) a conduit communicating through the upper end of the vessel for feeding molten alkali metal by gravity to the upper surface of the amalgam, (g) said tangential connection of the amalgam supply conduit and said tangential connection of the amalgam removal conduit effecting a swirled flow path for the amalgam between said connections and about the cone shaped device whereby the laterally extending baffle means provide and intimate mixture of the molten alkali metal with the amalgam.

References Cited by the Examiner

UNITED STATES PATENTS

| | | |
|---|---|---|
| 2,171,312 | 8/39 | Myers. |
| 2,588,677 | 3/52 | Welty et al. _____ 261—27 |
| 2,681,013 | 6/54 | Ogden _____ 137—392 X |
| 3,011,875 | 12/61 | Sumner _____ 23—285 X |
| 3,013,866 | 12/61 | Samaniego et al. _____ 23—285 X |

FOREIGN PATENTS

| | | |
|---|---|---|
| 226,217 | 1/60 | Australia. |

OTHER REFERENCES

Miller: Chemical Engineering Progress, vol. 57, pp. 140, 142 February 1961).

MORRIS O. WOLK, *Primary Examiner.*